United States Patent
Egan et al.

(10) Patent No.: US 7,919,304 B2
(45) Date of Patent: Apr. 5, 2011

(54) PROCESS AND APPARATUS FOR THE BIOFILTRATION OF VOLATILE ORGANIC COMPOUNDS

(75) Inventors: Imelda Egan, Newbridge (IE); Ian Phillips, Dublin (IE)

(73) Assignee: Bord Na Mona, Dublin (IE)

( * ) Notice: Subject to any disclaimer, the term of this patent is extended or adjusted under 35 U.S.C. 154(b) by 1032 days.

(21) Appl. No.: 10/475,842

(22) PCT Filed: May 3, 2001

(86) PCT No.: PCT/IE01/00058
§ 371 (c)(1), (2), (4) Date: Mar. 22, 2004

(87) PCT Pub. No.: WO02/089959
PCT Pub. Date: Nov. 14, 2002

(65) Prior Publication Data
US 2004/0152185 A1   Aug. 5, 2004

(51) Int. Cl.
C02F 3/34 (2006.01)
A61L 9/01 (2006.01)
A62D 3/00 (2007.01)
A62D 3/02 (2007.01)

(52) U.S. Cl. ............ 435/266; 435/262; 435/262.5; 435/264; 435/298.1; 435/299.1; 607/88; 607/90; 607/94; 55/512; 55/522; 55/524; 55/529; 96/290

(58) Field of Classification Search .......... 435/266, 435/262, 264, 298.1, 299.1; 607/99, 80, 607/94; 55/512, 522, 524, 529; 96/290
See application file for complete search history.

(56) References Cited

U.S. PATENT DOCUMENTS

| 4,421,534 A | 12/1983 | Walker ........................ 55/73 |
| 4,781,732 A * | 11/1988 | Wondrasch et al. .............. 95/71 |
| 5,861,303 A * | 1/1999 | Barshter et al. ............... 435/266 |
| 6,019,810 A | 2/2000 | Phillips et al. ................. 55/512 |
| 6,106,592 A * | 8/2000 | Paranjpe et al. .................. 95/65 |
| 6,524,848 B2 * | 2/2003 | McNelly .................... 435/290.1 |
| 6,737,020 B1 * | 5/2004 | Horton et al. .................. 422/24 |
| 2003/0047521 A1 * | 3/2003 | McGinness .................. 210/758 |
| 2003/0181962 A1 * | 9/2003 | Streeter ......................... 607/89 |
| 2003/0213734 A1 * | 11/2003 | Shieh et al. ................... 210/139 |
| 2009/0222069 A1 * | 9/2009 | Petersen et al. ................ 607/89 |

FOREIGN PATENT DOCUMENTS

| EP | 0402704 B1 | 4/1994 |
| GB | 2300824 A | 11/1996 |

OTHER PUBLICATIONS

Ottengraf et al, Bioprocess Engineering 1, 1986, pp. 61-69, Biological elimination of volatile xenobiotic compounds in . . . .

* cited by examiner

Primary Examiner — Nathan A Bowers
(74) Attorney, Agent, or Firm — Jacobson Holman PLLC

(57) ABSTRACT

A process and system are disclosed for the biofiltration of volatile organic compounds. The process involved recirculating contaminated effluent gas through a biofilter (1), the biofilter (1) having an inlet (20), outlet (15) and micro-organism laden filter media bed (3). The filter media bed additionally having moisture retaining properties. This process has been effective in removing high levels of VOCs from effluent gas streams and also in removing VOCs from an effluent gas stream where the VOC levels and/or volumes of effluent gas vary over time.

14 Claims, 7 Drawing Sheets

Figure 1:
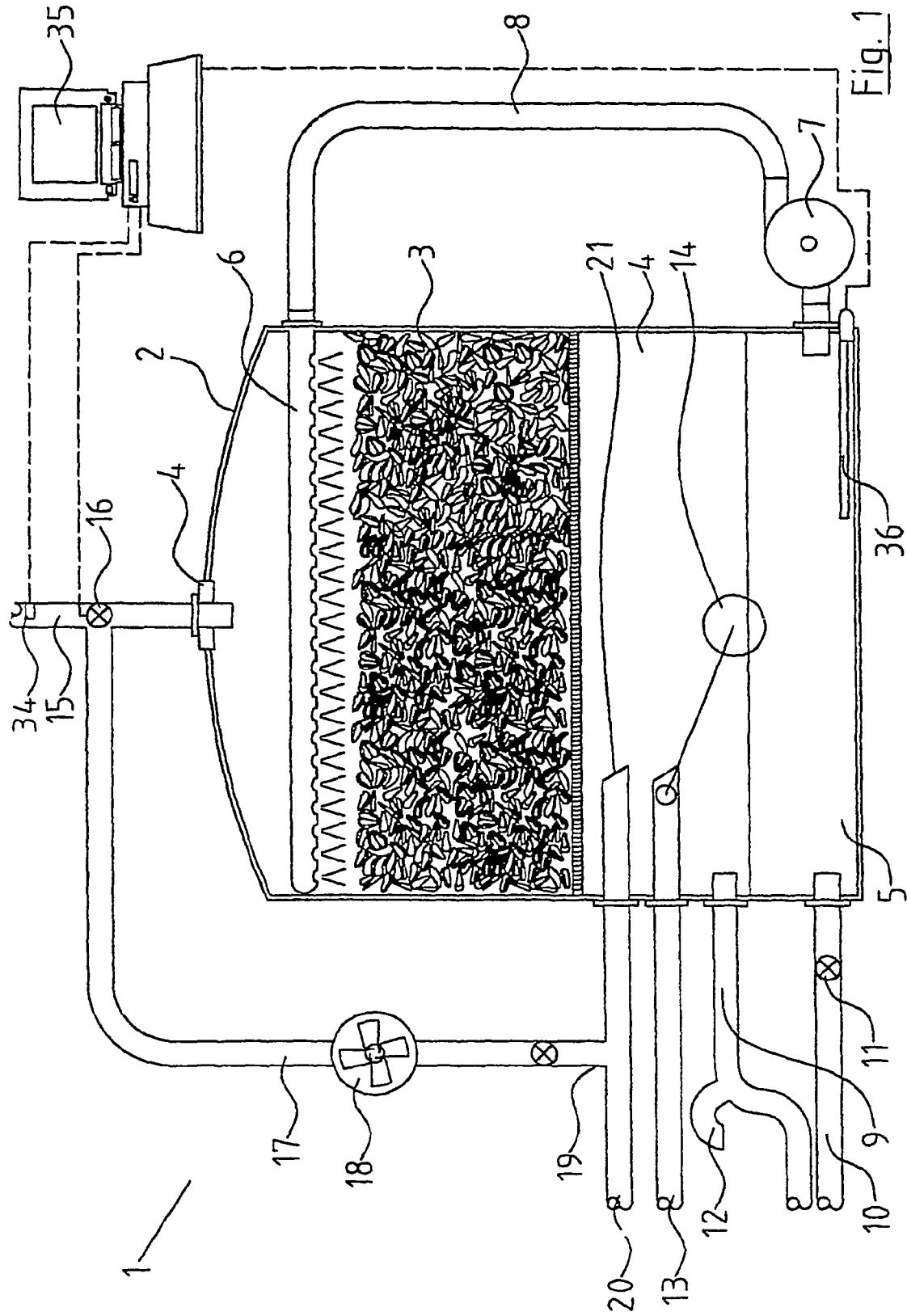

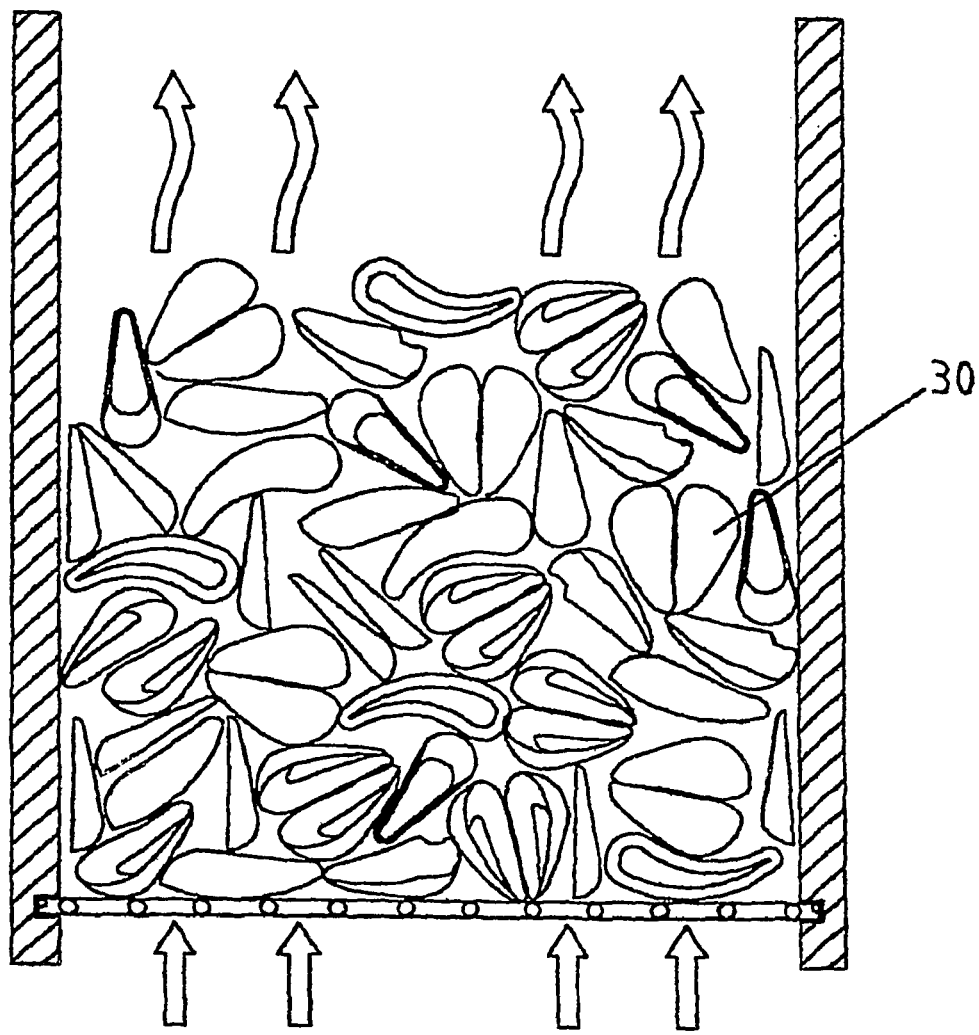
Fig. 3
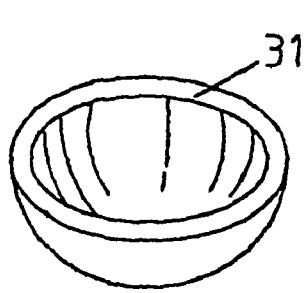
(a)
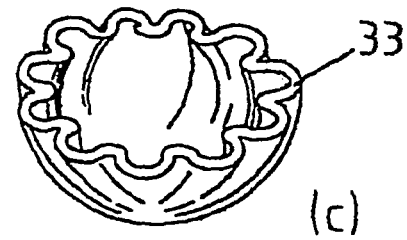
(c)
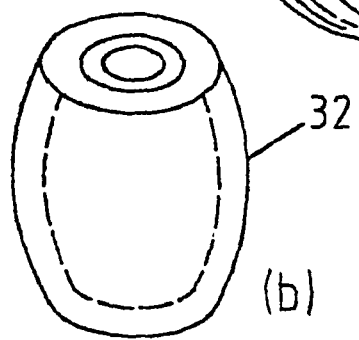
(b)
Fig. 4

PROCESS AND APPARATUS FOR THE BIOFILTRATION OF VOLATILE ORGANIC COMPOUNDS

This is a nationalization of PCT/IE01/00058 filed May 3, 2001 and published in English.

The present invention relates to the biofiltration of volatile organic compounds (VOCs). A VOC may be defined as an organic species i.e. one containing Carbon and Hydrogen and possible other components such as Nitrogen, Sulphur or Halogens, which is readily evaporated at room temperature. The term VOCs covers a wide range of chemical classes, including aliphatic, aromatic and chlorinated hydrocarbons, alcohols, ketones, acids, ethers, esters and aldehydes.

These species contribute either directly or indirectly to a number of environmental issues and concerns, the nature and extent of the contributions depend on the chemical structures of the individual compounds. The major issues for concern are:

effects on human health and on natural ecosystems through toxicity, carcinogenicity and other adverse physiological effects;
tropospheric photochemical oxidant formation;
stratospheric ozone depletion;
global climate change;
odour; and
ground level ozone formation.

VOC's arise from the activities of man and also from natural sources. The activities, which contribute to elevated VOC concentrations in the environment, include:
printing and coating industries which use solvents;
transportation-hydrocarbon fuel combustion and storage;
waste management-landfills, water treatment plants;
petrochemical industries; and
pharmaceutical manufacturing.

It has long been recognised that biofiltration is a suitable and cost effective method of VOC emission destruction for low to medium concentration regimes. Conventional teaching dictates that the longer the resident time effluent gas is in a biofilter, the greater the removal efficiencies (Ottengraf S. P. P., J. J. P. Meesters, A. H. C. van der Oever, H. R. Rozema. Biological Elimination of Volatile Xenobiotic Compounds in Biofilters). A residence time of typically 60-90 seconds in the filter medium is recommended. This generally follows zero order removal kinetics where a concentration gradient forms in the biofilter with greatest concentration at the inlet and removal is thus greater for longer retention. It has been found that retention times of greater than about 90 seconds are not applicable as the air moves so slowly through the filter, that channelling can occur. Additionally, it becomes very uneconomical as filter sizes must be increased significantly. The literature maintains that the VOC elimination capacity for conventional biofilters is in the range 10 to 40 g VOC/$m^3$ media/hr.

Our British Patent Specification No. 2300824 describes and claims various new packing materials that have considerable advantages over packing materials used heretofore. One of the major problems that was identified in this British Patent Specification was the fact that in dealing with effluent treatment, the level of contaminant produced can vary widely. Industrial waste can vary widely, depending on the conditions of operation of the plant, the source of the waste. Thus, there can be extensive daily variations in the VOC levels experienced both in sewage treatment plants and in industrial and agricultural plants. Further factors, as have been described in this British patent specification, can impact on the levels of contaminants experienced. A major problem is that if the average inlet concentration of VOC's is used in the design specification, then the system may not be capable of coping with peak levels. If, on the contrary, the system is designed for peak loadings, then it may not produce an optimum result due to nutrient starvation of microorganisms within the biofilter at the much lower VOC levels. A further problem with designing for peak levels is obviously one of cost in that the filter bed and consequently the biofilter must be larger than is required for average conditions. The system of British Patent Specification No. 2300824 goes a considerable way towards increasing the ability of a biofilter to handle these various loads.

It should be noted that in this present specification, when we refer to biofiltration, we are also referring to bioscrubbing systems and that the former term is used to describe both systems.

It should also be noted that the term "biofilter throughput rate" refers to the rate at which effluent gas passes through the gas inlet and outlet as distinguished from the "filter media throughput rate", which refers to the rate at which effluent gas is drawn through the actual filter media bed.

The terms "packing", "packing materials", "filter media bed"; "media" and "shell media", as used in this specification, are intended to have the same meaning and are used interchangeably such that while a reference to shell media may be used as a specific reference to one type or media it is to be understood that other suitable media may be used.

As mentioned above, one of the major problems and design limitations appears to be that if the concentration of the VOCs increase beyond a certain level, then the biofiltration system does not appear to be able to remove sufficient quantities and it is necessary to either reduce the gas flow thereby increasing residence time or to dilute the incoming gas. Unfortunately, previously, both of these courses led to an increase in biofilter size.

An obvious requirement for an efficient biofilter is that microorganisms are present at sufficient cell densities to degrade the levels of contaminants entering the biofilter. Also once a biofilm is formed the fraction of active biomass to the total biomass may be relatively small. It follows thus that the more concentrated the organics in the air stream the more biomass will be formed.

This is a problem with biofilters generally i.e. the need for the prevention of excessive build-up of biomass due to high VOC concentrations. Consequences of biomass formation are that it can cause clogging of the biofilter and spoiling of the recirculation water. Researches and pilot studies carried out by the Applicant have shown that back pressure can increase up to five times the original value, through a clogged media bed. This leads to a decrease in the efficiency of the biofilter and an increase in the energy needed to deliver the effluent gas through the biofilter. With particulate filter media especially, the microorganisms bridge the gap between the particles and blockages begin to occur. The preferential growth of filamentous bacteria within the biofilm may be one of the primary reasons that the filter media becomes clogged. This causes an increase in the pressure drop over the filter bed and thus treatment of the contaminants becomes significantly reduced if not stopped. There is thus a need for a preventive mechanism inhibiting the proliferation of excessive biomass whilst not affecting viability of the "desired" microorganisms.

Another well-known problem associated with biofilters is the relative insolubility of VOCs in water. A well-known feature of biofiltration of airborne contaminants is the requirement to transfer the pollutant into the aqueous phase before biodegradation can occur.

The present invention is also directed towards promoting more efficient mass transfer of VOCs into the aqueous phase.

Microbial starvation can also be due to low inlet air levels. British Patent Specification No. 2300824 went a considerable way to ensuring that the biological system was adequately seeded with bacteria and that the culture would survive during periods of starvation as inlet VOC concentrations drop.

Another of the major problems with any biofiltration system is the necessity to keep the energy consumption low. Effectively, this means that there must be a low back pressure generated in the packing material. Thus, the correct choice of packing material is vital.

There is a need for such systems to handle high and variable levels of contaminant gases generally and in particular, high and variable concentrations of VOC's. The present invention is directed towards this.

STATEMENT OF INVENTION

According to the invention, there is provided a process for the biofiltration of volatile organic compounds (VOCs) of the type comprising delivering contaminated effluent gas through a biofilter, the biofilter having an inlet, outlet and a microorganism laden filter media bed, the filter media bed additionally having moisture retaining properties and which filter media bed is suitable for the absorption, microbial oxidation and degradation of the VOCs characterised in that the method comprises:— delivering contaminated effluent gas to the biofilter inlet at a biofilter throughput rate and removing the filtered gas through the outlet at the same rate; and recirculating the contaminated effluent gas within the biofilter whereby the rate at which gas passes through the filter media exceeds the biofilter throughput rate at the inlet and the outlet and wherein the inlet gas is effectively diluted within the biofilter.

This process of recirculating the air within the biofilter apparatus has the effect of significantly enhancing removal efficiency of VOCs from contaminated effluent gases without a significant increase in the running and maintenance costs of an apparatus according to this invention.

This novel recirculation of contaminated air results in a number of advantages over traditional abatement systems. Previously, such systems were not very efficient in handling contaminated air in which the VOC levels vary over time. Recirculation using this process results in an apparent dilution of the incoming effluent gas. Therefore, the effects of variable VOC concentration are minimised and removal can be effected more efficiently. Traditionally, a system coping with widely variable VOC levels would have to be very large. Consequently, running costs are significantly increased. A recirculation process negates the need for a large costly apparatus thereby running and maintenance costs are reduced.

In further embodiments, the VOC concentration at the inlet and outlet is monitored. This measurement of inlet and outlet VOC levels allows a determination to be made as to the efficiency of the biofiltration process. If the outlet levels of the VOC are above predetermined levels then action can be taken to reduce these levels to below the limit. In a preferred embodiment the VOC concentration in the output gas is monitored and when the concentration exceeds a preset limit recirculation is carried out. Also, as has been stated previously, it is obviously desirable to have as low running costs as possible. By monitoring the VOC content of the inlet and outlet gas, the recirculation process can be switched on or off depending on the VOC concentration. At high VOC concentrations recirculation switches on and at low concentration recirculation is off.

In another embodiment according to the present invention the biofilter throughput rate is determined having regard to the volume of effluent gas to be processed. The volume of effluent gas to be processed may vary widely and as such, it is desirable that the biofilter throughput rate is adjusted to cope with the varying volumes of gases. For example, if the volume of effluent gases produced increases then it may be necessary to increase the biofilter throughput rate to cope with this increased volume and vice versa.

The rate at which contaminated air travels through the system is very important to maintain a constant and efficient removal of VOCs. If gas travels through at too high a rate, then the VOCs are not in contact with the filter media bed for sufficient time to effect efficient VOC removal. If the gas is travelling through too slowly, then channelling may occur and efficient treatment of the total contaminated gas is not effected.

In another embodiment, the number of times recirculation is carried out and hence the media throughput achieved, depends on the back pressure generated by the filter media.

Maintaining back pressure at a low level is very important to energy efficient biofilter operation. When back pressure increases significantly, energy output increases considerably as more energy is need to draw air through the filter media. Thus, in order to maintain an energy efficient system, the maximum rate at which air travels through the system and the number of times the air is recirculated is controlled in order to prevent an excessive build-up of back pressure.

In a preferred embodiment, the VOC concentration in the output air is monitored and when the VOC concentration exceeds a preset limit, recirculation is carried out.

The colony forming unit counts of microbes in the filter media bed has to be maintained at levels that will provide efficient removal of the VOCs. The recirculation process is carried out and maintained at a level that allows the microorganisms to remain viable for periods of time when the VOC concentration is at or below the minimum level. Thus in one embodiment, when the VOC levels of the inlet gas are too low recirculation is carried. Alternatively in another embodiment when the inlet level of VOCs falls below a preset limit for a predetermined length of time VOCs are added to the filter media bed. Traditionally with biofilters and the bioscrubbers nutrients can be added in order to maintain a viable biomass during periods of starvation. Microbes in a biofilter according to the present invention however, can remain viable for up to seven days after complete shut-down of the biofilter by utilising residual VOCs dissolved in the liquid reservoirs. When these residual dissolved VOCs have been exhausted trace levels of VOCs are added to the filter media via in one embodiment the sump and recirculating liquid, or in another embodiment by delivering liquid with dissolved VOC's across the filter media bed. Again, this prevents the microorganisms from perishing due to low VOC levels in the effluent gas.

According to one embodiment of the invention there is provided a process in which the filter media bed is kept moist by delivering liquid across the filter media bed. It is advantageous that the filter media bed be kept wet as the break down of VOCs by the microorganisms is facilitated by a moist environment. However, if VOC levels are low in the effluent gas this may lead to microbial starvation as stated previously. Deliberate VOC addition to maintain a viable biomass, by the liquid that is delivered across the filter media bed ensures that the VOCs are uniformly dispersed within the filter media bed.

Moisture retention is a major problem in any biofiltration system and this has been long appreciated by the use of material in the formation of the media that is inherently adapted to retain moisture. Unfortunately, there are consequent problems in using such materials. Thus, it is known to use some of these with calcareous materials. With a calcareous material, it is essential that sufficient moisture be retained within the media to ensure the growth of bacteria thereon. This can only be done if the media is sufficiently moisture retentive and heretofore required that it should be mixed with, for example, peat, or indeed be continuously sprayed. The use of liquid reservoirs overcomes this problem.

It is almost impossible to overemphasise the importance of the liquid retention portion of the calcareous elements on the efficient operation of the effluent treatment system according to the invention. As mentioned previously moisture retention as with traditional biofilters is of utmost importance in order to satisfy the liquid requirements of the microbial population. Advantageously the moisture retaining properties of the present invention also allow the microbial population to remain viable for sustained periods of low VOC levels or periods whereby no VOCs are entering the biofilter, by providing a reservoir of dissolved VOCs to sustain the microbes.

Another important feature of the process according to the present invention is the rate at which water passes through the biofiltration system. This unlike traditional biofilter processes where liquid is provided only to satisfy the moisture requirements of the micro-organisms the rate at which the liquid passes through the media bed is important in ensuring an efficient VOC elimination capacity of the biofilter. This rate is very high when compared to traditional biofilters. A high rate is advantageous as it is this in conjunction with a high media throughput rate of gas that promotes a more efficient biological degradation of dissolved VOCs. However, the rate can vary according to the level of VOCs passing through the biofilter. At high VOC levels the rate is higher. At low VOC levels the rate need not be so high and can be reduced in order to conserve energy output of the pump, thereby reducing running costs of the biofilter.

Accordingly, there is provided a process for the biofiltration of VOCs wherein the rate at which liquid passes through the filter media bed is varied according to the level of VOC passing through the filter media bed. Preferably the rate is between 20 and 50 l/m$^3$ media per minute and is ideally 30 l/m$^3$ media per minute.

In a further embodiment the wetting is achieved by recirculating water over the packing from a storage sump.

In yet another embodiment of the process the liquid delivered across the filter media bed is stimulated electromagnetically.

According to one embodiment a process for the biofiltration of volatile organic compounds (VOCs) of the type comprising delivering contaminated effluent gas containing odorous compounds through a biofilter having an inlet, outlet and a filter media bed, the filter media bed having micro-organisms, nourishment and moisture retaining properties which are suitable for the absorption, chemical degradation and microbial oxidation of the VOCs and which process also includes delivering liquid across the filter media bed characterised in that the method comprises:—
   delivering contaminated gas to the biofilter inlet at a biofilter throughput rate and removing the filtered gas at the same rate;
   recirculating the contaminated gas within the biofilter whereby the media throughput of gas through the filter media exceeds the filter throughput rate from inlet to outlet; and
   electromagnetically stimulating the liquid which is delivered across the filter media bed;
is provided.

In another embodiment, the VOC concentration in the output gas is monitored and when the VOC concentration exceeds a pre-set limit, recirculation is carried out.

In yet another embodiment when the inlet concentration of VOC falls below a pre-set limit for a predetermined length of time VOCs are added to the filter media bed.

In a further embodiment the biofilter throughput rate is determined having regard to the volume of effluent gas to be processed.

According to the invention, a biofiltration system is provided for the removal of VOCs from contaminated effluent gas. The system is of the type comprising a biofilter housing, a gas inlet in the housing for reception of the contaminated effluent gas, a gas outlet for delivery of de-contaminated gas from the biofilter, a microbe carrying filter media comprising a plurality of randomly arranged elements of calcarous material having a liquid retention portion, many of which are oriented to form an individual and liquid retaining reservoir within the packing characterised in that gas recirculation means are provided for capturing some of the air adjacent the gas outlet for delivery back into the biofilter housing adjacent the gas inlet.

Ideally, the filter media has a bulk density of less than 900 g/liter, in some instances less than 600 g/liter, and indeed in one embodiment has a bulk density of approximately 500 g/liter. The lighter the media can be, the less problems there are with structural integrity of any column of the packing material, also, the greater depth of packing material that can be achieved before the structural integrity of the elements becomes important.

In one particularly advantageous embodiment of the invention, the filter media is spent shell of shell fish. There are enormous and unforeseen advantages in using the spent shell of shell fish. Firstly, it is a by-product of various food operations in that oysters, whelks, mussels, clams and so on are processed in factories which produce a large amount of spent shells which then have to be disposed of, causing pollution. In any event, the disposal of such shells is expensive. Anything that removes the necessity to spend money on the disposal of the shells but additionally makes them a valuable commodity is obviously extremely advantageous. It has long been appreciated that spent shells of shell fish are a major source of calcium material. It would be wrong to underrate the disposal problem experienced by many shell fish processors. A further advantage of the use of spent shells is that they are of a particularly useful shape in that some of the shells will be broken, others will have their full structural integrity and so on, so that the bed formed by the use of the spent shells will be a bed that will ensure adequate flow of gases and adequate retention and moisture by providing a sufficient number of shells which will form individual liquid reservoirs. It has been found that mussel shell or, more correctly, a half mussel shell is particularly advantageous as there is a large amount of mussel shell available after processing in factories. It is particularly appropriate to use such a shell as it is not alone efficient in use, but equally needs to be disposed of on a regular basis. Thus, the raw material for the initial preparation of the system packing, together with its replacement when the shell used has passed its useful life, is readily available and inexpensive. Further, mussel shell is particularly structurally rigid.

Ideally, the shell material is a half mussel shell and preferably is of the species *Mytilus Edulis*. *Mytilus Edulis*, which is readily available, has in practice turned out to be particularly useful as a form of shell for use in the present invention.

In a biofiltration system in accordance with the invention, the packing may include one or more additional packing materials. In many instances, it will be advantageous to provide different filter media materials because they can add to the efficiency of the effluent treatment particularly where specific effluent gases are likely to be treated on a regular basis. However, the calcarous material according to the present invention and in particular, elements of calcarous material each having a liquid retention portion are particularly advantageous for mixing with other media in the sense that these liquid retention portions will also provide a means for retaining the other media in position in the bed and ensuring that such other media is not washed away or otherwise removed from the bed.

Some or all of the elements may be formed from ground calcarous material mixed with a binding agent. If ground calcarous material is used to make what is effectively a totally artificial element to form the packing, there are considerable advantages. Firstly, the binding agent can be chosen to provide the correct degradation of the calcarous material. Suitable trace elements and additives may also be combined with the calcarous material to further enhance the efficiency of the system. Additionally, because a binding agent is used and the media is manufactured, the correct size and shape of the media can be chosen to provide the most efficient filtration system.

Thus, the packing chosen can be totally uniform in shape or can be provided by a number of different shapes to ensure there is an adequate flow of gas through the media. Also, the use of different shapes can allow the mixing of other materials therewith and the medium can be so shaped as to ensure that such other additional packing materials can be retained within the medium. Structural requirements to ensure such additional packing materials are adequately supported can be achieved by manufacturing the elements in the desired and optimum shape. Shapes can be devised and designed to ensure, for example, in conditions where evaporation could be a problem, that the liquid retention portion is so designed as to have a large capacity and a relatively small surface area exposed to ambient conditions.

Preferably, the binding agent is acid resistant. It will be appreciated that the binding materials must be such as to ensure that in generation of acid within the system, the elements do not degrade and cause the packing to lose its structural integrity.

Ideally, the binding agent is Keratin. This is a particularly suitable binding agent for combination with the calcarous material used in accordance with the invention.

Many additional packing materials such as one or more of heather, peat nodules, activated carbon, alumina and plastics media may be used. Heather, peat nodules, activated carbon, alumina and plastics media have all been shown to have their advantages. While in many instances, certain of these may not be totally biodegradable, they have other advantages in, for example, with a plastics material, adding to the structural rigidity of the structure and providing, if suitably shaped, further individual liquid reservoirs.

Ideally, wetting means are used and such wetting means usually comprises a spray operating under gravity. It is obviously very useful to ensure that the packing is sufficiently moist. The wetting means may be operated intermittently. This is assisted by the fact that the packing according to the present invention is formed from a number of randomly arranged elements each having a liquid retention portion which may form an individual liquid reservoir depending on the orientation of the element within the packing and thus it is not necessary to continuously wet the packing and this leads to both operational and other savings. In many instances in accordance with the invention, the wetting means is operated continuously and may indeed be achieved by recirculating water over the packing. It is obviously generally advantageous to wet the packing continuously if water can be recycled and recirculated. In many instances, the water used will be the final run water of the treatment plant itself.

In a particularly useful embodiment of the invention, the wetting is carried out in concurrent flow to the flow of the gas stream through the packing. The advantage of this is that with concurrent flow, the maximum reaction with the calcarous material takes place at the top of the packing bed and hence the maximum amount of chemical reaction with the elements of calcarous material occurs at the top of the packing and thus, as it deteriorates, it contributes less, by its deterioration, to the general reduction in structural rigidity of the packing than it would if the water and gas were in counterflow.

In another useful embodiment, the liquid provided by the wetting means is stimulated electromagnetically.

A preferred embodiment according to the invention has a biofiltration system for the removal of VOCs from contaminated effluent gas of the type comprising a biofilter housing, a gas inlet in the housing for reception of the contaminated air, a gas outlet for delivery of de-contaminated air from the biofilter, a bacteria carrying packaging comprising a plurality of randomly arranged elements of calcareous material having a liquid retention portion, many of which are oriented to form an individual and liquid retaining portion within the packaging and a means for wetting the packaging characterised in that gas recirculation means are provided for capturing some of the air adjacent the gas outlet for delivery back into the biofilter housing adjacent the gas inlet and wherein means are also provided for electromagnetic stimulation of the liquid provided by the wetting means.

Preferably, a biofiltration system is provided wherein the wetting means comprises a spray means. Ideally, the wetting means is achieved by recirculating water over the packing from a storage sump.

Another aspect of the system incorporates a filter media bed with a bulk density of less than 900 g/liter. According to another aspect, the calcareous material is half mussel shell, which ideally is of the species *Mytilus Edulis*

DETAILED DESCRIPTION OF THE INVENTION

The invention will be more clearly understood from the following description of some embodiments thereof, given by way of example only, with reference to the accompanying drawings in which:—

Figure 2:
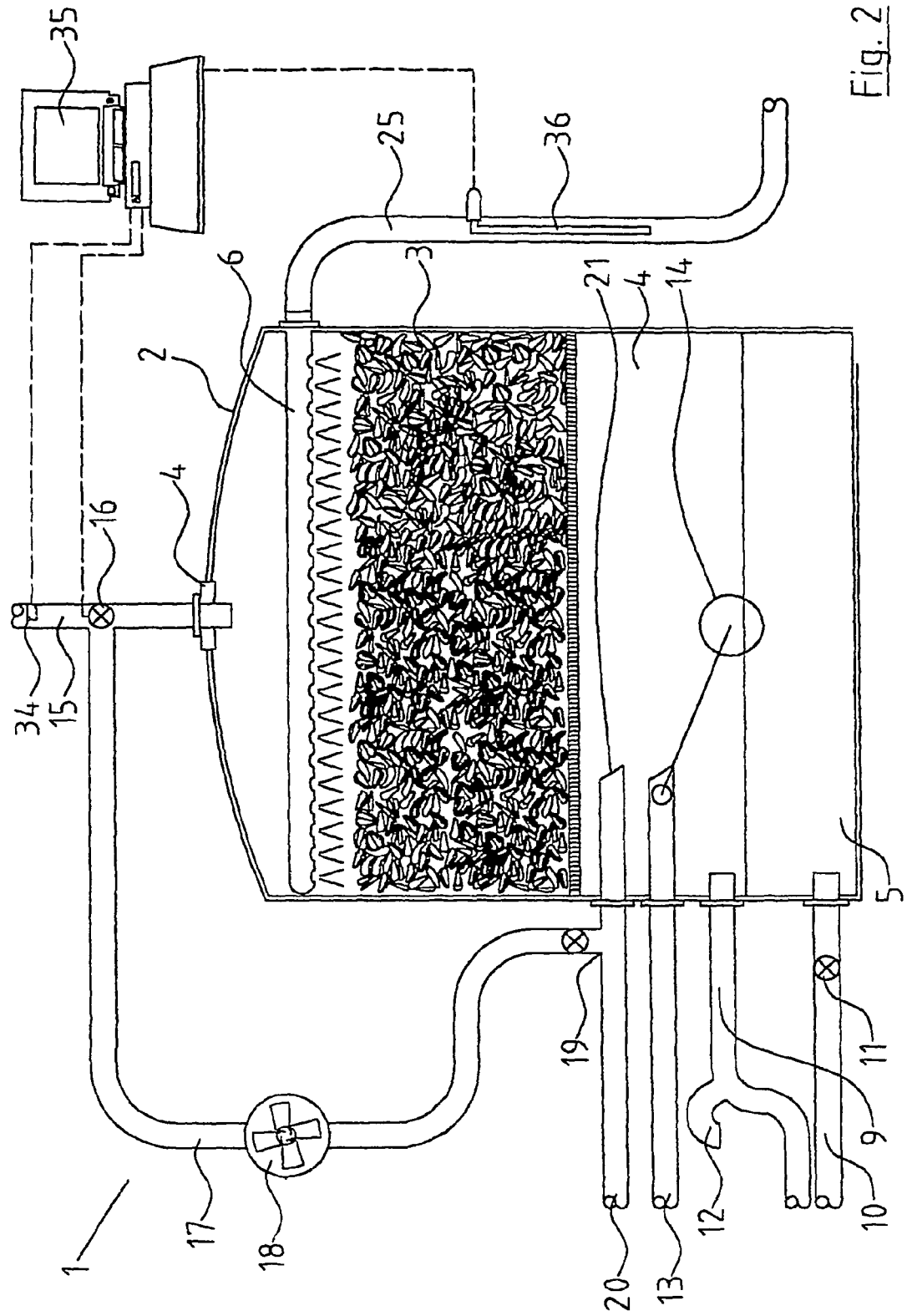

FIG. 1 is a schematic elevational view of a biofilter according to the invention, FIG. 2 is a view similar to FIG. 1 of another biofilter according to the invention, FIG. 3 is a view of portion of a filter bed incorporating a packing material, FIGS. 4(*a*) to (*c*) illustrate various other forms of packing material according to the invention, and FIGS. 5 to 8 show results of tests carried out.

Referring to the drawings and initially to FIG. 1, there is illustrated a biofilter, indicated generally by the reference numeral 1. In this case, the biofilter 1 acts as a gas scrubber and should be more properly called a bioscrubber. The biofilter 1 comprises a biofilter housing 2 containing packing material 3 below a contaminant gas manifold 4. The housing 2 has a water sump 5 and a water sprinkler bar 6 respectively below and above the packing material 3. The sump 5 is connected by a water recirculation pump 7 and piping 8 to the sprinkler bar 6. The sump 5 has a conventional overflow pipe 9 and a drain-off pipe 10 incorporating a drain-off valve 11. A vent 12 is also provided in the overflow pipe 9. A water make-up pipe 13 feeds the water sump 5 through a ball cock 14. A gas outlet pipe 15 is mounted in the top of the housing 2 and in turn houses a valve 16 to which is connected a recirculation pipe 17 and recirculation fan 18 which feeds at 19, a main contaminant gas inlet pipe 20 which then feeds the biofilter housing 2 through an inlet 21 below the packing material 3. A gas sensor 34 is connected to a controller such as a programmed PC 35 which is used to control the valve 16. An electromagnetic radiation device 36 is mounted in the water sump 5 and connected to the PC 35.

Referring now to FIG. 2, the biofilter 1 illustrated is a pure biofilter and parts similar to those described with reference to FIG. 1 are identified by the same reference numerals. In this embodiment, the sprinkler bar 6 is fed directly from a mains water supply line 25 or where there is a considerable amount of liquid effluent from a final liquid effluent supply. Essentially, it will be appreciated that, strictly speaking, the biofilter 1 operates only as a biofilter in FIG. 2 and as a bioscrubber in FIG. 1, but the difference is relatively slight and it is convenient to refer to them both as biofilters.

The packing 3 comprises or at least contains a shell-like material having a bulk density of less than 900 g/liter, preferably less than 600 g/liter and typically approximately 500 g/liter. The shell-like material is in this case the spent shell of shell fish, particularly calcarous shell, especially mussel shells of the species *Mytilus Edulis*. The packing may include one or more additional packing materials. Additional packing materials may include one or more of peat nodules, activated carbon, alumina, or plastics media and the like. Indeed any similar packing material may be used.

Referring now specifically to FIG. 3, there is illustrated portion of a packing of mussel shells, identified by the reference numeral 30, and shows the random nature of the arrangement.

In use, the elements will be shovelled or thrown or otherwise roughly charged into the housing so that they will be randomly and not regularly arranged. Ideally these elements should not be broken. Broken elements can sometimes create areas within the filter media bed where the gas flow is increased compared to other areas. This creates a pressure differential across the filter media bed resulting in inefficient mass transfer of VOCs into the aqueous phase. The ideal situation is a uniform gas flow rate across the filter media bed.

Further, this random arrangement will ensure that some elements will fall one way and others another. For example, when the elements are of shell-like shape, whether of artificial construction or natural, they will nestle into each other, bridge each other, lie upright upside-down with the mouth facing downwards and not forming a liquid reservoir etc. Such a scattering of the elements will ensure packing that will be of a sufficiently open structure as to facilitate the passage of a gas stream therethrough.

The term shell-like, while particularly apt when considering shells or marine origin, does describe in general, if not very precise terms, the open-mouthed container-like construction of the individual elements constituting the packing, whether manmade or naturally occurring.

FIG. 4 illustrates various artificially formed shell-like elements, identified by the reference numerals 31, 32 and 33 respectively. Each of these packing elements 31, 32 and 33 can be formed of any suitable calcarous material and a binder and may be formed by any suitable moulding or other formation techniques. The packing element 31 is the simplest construction, being essentially a dish or shell-like structure, while the packing element 32 has a much narrower mouth, or opening as it where than the packing element 31. The packing element 33 shows the provision of an irregular outer surface that will further promote the adherence of moisture and biologicals active material thereto as well as providing a greater available surface.

It is envisaged that many suitable binders could be used. It would be possible to provide a binder than would ensure there was sufficient free calcium available to allow the packing to be inoculated with bacteria mixed with sodium alginate, for example. A particularly suitable binder is Keratin. However, other suitable binders may be used.

In operation, the biofilter 1 can be operated in two ways with and without contaminate gas recirculation through the gas recirculation pipe 17. How this operates will be described in more detail below. When the valve 16 is used to recirculate contaminate gases, it can be controlled by a gas sensor, such as gas sensor 30, either at the inlet 21 further upstream or at the gas outlet pipe 15. The operation will become apparent from the following examples.

There are a number of conditions that will dictate when contaminant gas recirculation will occur. These will be described in detail below. During operation, without recirculation, the biofilter will operate essentially as traditional biofilters such as that described in the applicant's Patent Application No. GB 2300824. In practice, the decontaminated gas passing through the outlet is continuously or intermittently monitored. If the VOC concentration in the gas outlet pipe 15 exceeds a preset limit such as that dictated by environmental regulation for exhaust gases, the recirculation process is switched on. During normal operation, gas is drawn through the biofilter at a rate within an optimal range. This will be between 100 to 300 $m^3$ gas/$m^3$ media/hour. In one embodiment, recirculation is effected by controlling the valve 16 and allowing a proportion of the gas to be recirculated and to re-enter the biofilter housing 2 via the connection 19 with the inlet pipe 20. Recirculation is effected such that the volume of gas through the outlet pipe 15 is approximately equal to the volume of gas through the inlet pipe 20. When the recirculated gas enters the inlet pipe 20, a dilutory effect is achieved on the inlet gas as the recirculated gas has already had a percentage of the VOC removed. As mentioned previously, the dilutory effect helps to negate the previously problematic situation of variable VOC levels.

Described above is one situation, i.e. responding to variable VOC levels where recirculation is effected. Another situation is where the volume of exhaust gas from the plant varies over time. For example the volume of exhaust gases produced may peak at certain times of the week or indeed at certain times of the year. In this case, the volume of gas passing through the biofilter must be increased to accommodate with the increased volume of exhaust gases. Such an increase may take the biofilter throughput rate above the maximum optimum throughput rate for efficient and optimal VOC removal. Consequently, VOC removal efficiency will fall. However, when recirculation is carried out, as described above, even at this non-optimal throughput rate, the level of VOCs removed can still bring the levels in the outlet gases below the pre-set limit.

In short, it is envisaged that the recirculation process will allow the removal of VOCs from plants where firstly the VOC concentration can vary over time and secondly, where the volume of exhaust gases from the plants can also vary over time. Recirculation also allows the treatment of exhaust gases wherein the VOC concentrations are above those that could be handled by conventional biofilters. Recirculation causes the gases to come into contact with the filter media bed an increased number of times. A given volume of gas recirculated three times will have approximately 30 to 40% of the VOCs removed. This is equivalent to conventional biofilters at these VOC concentrations and air loadings and an actual residence time of 96 to 110 seconds during each pass. The accumulative effect is the achieval of approximately 80 to 95% removal efficiencies or VOC.

However, prior to describing the various examples, it should be appreciated that conventional biofilter wisdom would dictate that recirculating air would be of no advantage in the bio-treatment of VOCs. We have discovered certain unusual phenomena that we did not expect would happen with biofilters in accordance with the invention. When the biofilter was loaded in conventional manner at a range of air volumes between 100 to 300 $m^3$ air/$m^3$ media/hr representing a retention time of between 36 and 12 seconds with heavily contaminated air, that is to say, with VOC concentrations of the order of 500 mg/$m^3$ upwards, a removal efficiency of ~30% was consistently attained. This is contrary to normal removal principles, since as the retention time was decreased, removal remained constant. Thus, whether the airflow was at 100 $m^3$ air/$m^3$ media/hr or at 300 $m^3$, air/$m^3$ media/hr for these VOCs, the same removal efficiency was maintained. It is difficult to state with any certainty why this should be. Thus, much of the following is speculative and requires further analyses. It appears to be that with a packing material according to the present invention, there is a mass transfer of pollutants into an aqueous phase rather than a concentration gradient across the biofilter. Having discovered this, it was then decided to recirculate air through the biofilter. With an input air of 100 $m^3$ air/$m^3$ media/hr, by recirculating three times, effectively having a net loading of 300 $m^3$/$m^3$ media/hr, greater removal efficiencies were achieved. These again were of the order of 30% at each pass of the air through the biofilter and thus with VOCs of the order of >500 mg/$m^3$, the total VOC removal was at the rate of up to 90% efficiency. As far as can be ascertained, the recirculating gas appears to provide a net effective dilution of the inlet gas by a factor of the recirculation ratio, however, this is not a dilution in the normal sense of the word as the outlet and inlet volume flows of gas remain the same. In other words, the inlet and outlet rate is not effected. Secondly, the treatment of the gas a number of times appears to achieve removals each time equivalent to removal in conventional biofilters at these VOC concentrations and air loadings, thus significantly increasing removal capacity per cubic meter of media.

It appears that there is a radical changing of airflow dynamics, which promotes mass transfer of insoluble compounds and reiterative biological degradation. Mass transfer of relatively soluble VOCs is also promoted by an increased rate at which water passes through the filter media bed. At high VOC loadings this rate can be as high as 50 l/$m^3$ media per minute. It is important to realise that this rate is very high compared to traditional biofilter processes.

It is also envisaged that when VOC levels are low or nil for a sustained period, trace amounts of VOC's are added to the filter media bed 3. In one embodiment the VOC's are separately dissolved in the liquid within the sump 5 and the liquid is recirculated via a recirculation pipe 8 so that the dissolved VOC's are delivered across the filter media bed 3 by the wetting means 6. In an alternative embodiment where the liquid is not normally recirculated but rather is delivered to the biofilter housing 2 by a mains supply (FIG. 2) the liquid can be recirculated.

A number of trials by the Applicant have shown the application of electromagnetic radiation to the recirculation liquid has a significant effect in preventing the build-up of biomass and increasing the dissolution properties of the recirculating liquid. The electromagnetic radiation appears to favour the growth of certain bacterial species while inhibiting the growth of others. The proliferation of filamentous bacteria i.e. those that may cause clogging of biofilters are inhibited by the electromagnetic radiation thus reducing an accumulation of biomass on the filter media which can lead to clogging, and thus a decrease in removal efficiency.

The first test carried out in accordance with the invention is given below where it will be seen that, quite clearly, because of the unique nature of the packing, increasing the airflow loading per cubic meter of media up to 3 times the loading on conventional biofilters, (and thus decreasing retention time) did not decrease removals of relatively high concentrations of VOCs. Thus, when recirculation took place, the efficiency increased enormously.

Figure 5:
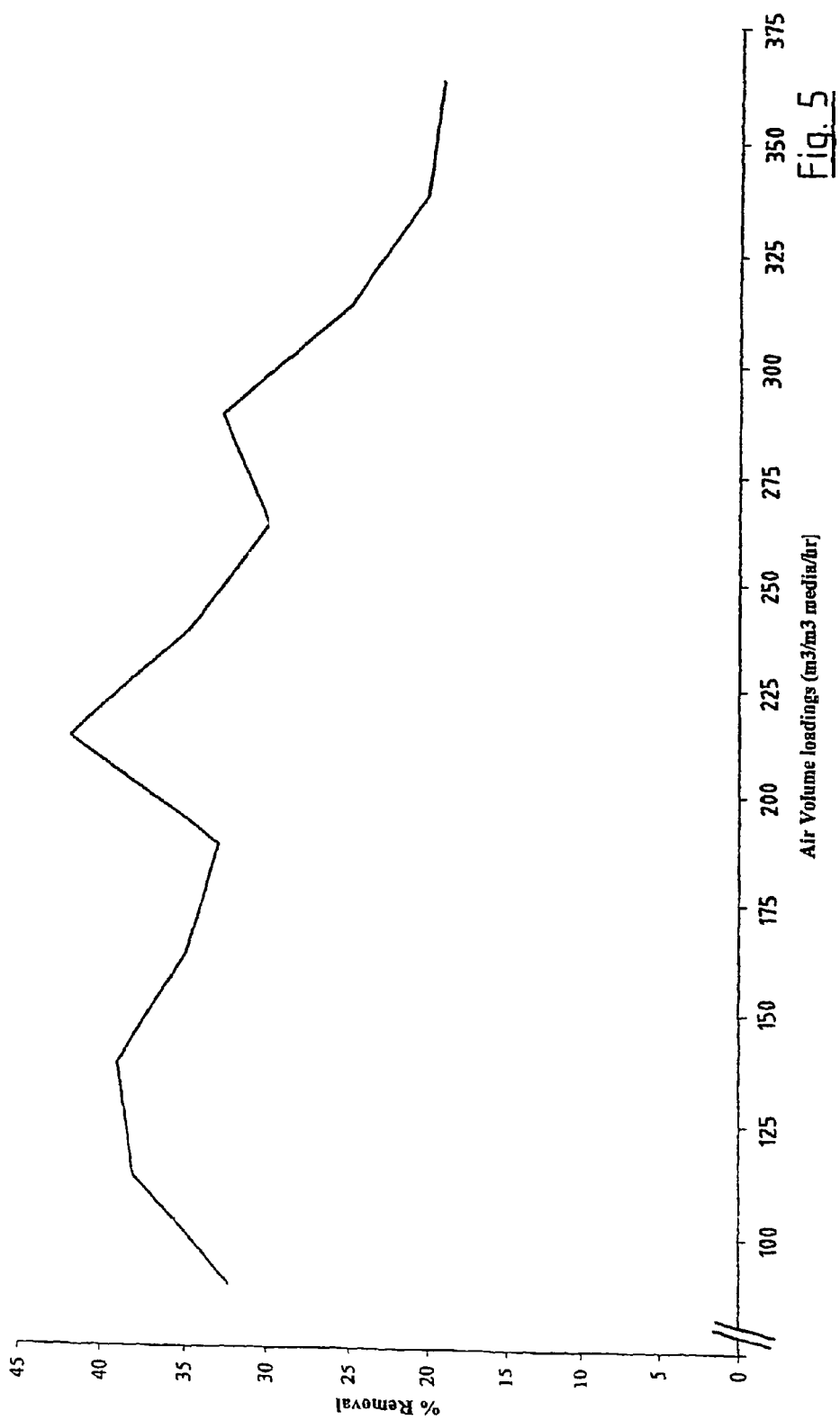

Test No. 1
- The airflow through the columns was set primarily at 150 $m^3$/hr/$m^3$ media
- Total solvent load was set at: >500 mg/$m^3$ in a 1:1:1 ratio of Benzene:Xylene:Toluene (relatively insoluble VOCs)
- Removal efficiencies of total solvent over a period of 2 weeks remained at 35-40%
- The airflow to the column was increased to >300 $m^3$/hr/$m^3$ media for 2 weeks Removal efficiency fell to below 25%
- The airflow was subsequently pulled back to 280-300 $m^3$/hr/$m^3$ media.
- % Removal climbed back to 30-35%. This remained at this rate for one month.
- Therefore the maximum optimum loading for a straight single pass throughput application was established of 280-300 $m^3$/hr/$m^3$ media
- At this time, the pH of the recirculation water remained above 6 pH units at all times
- When scanned for organics, the recirculation water showed only trace amounts
- Mass balance figures from solvent usage and removal efficiencies were consistent over this period.
- The results of this test are shown in FIG. 5.

Test No. 2 was carried out as listed below.

Figure 6:
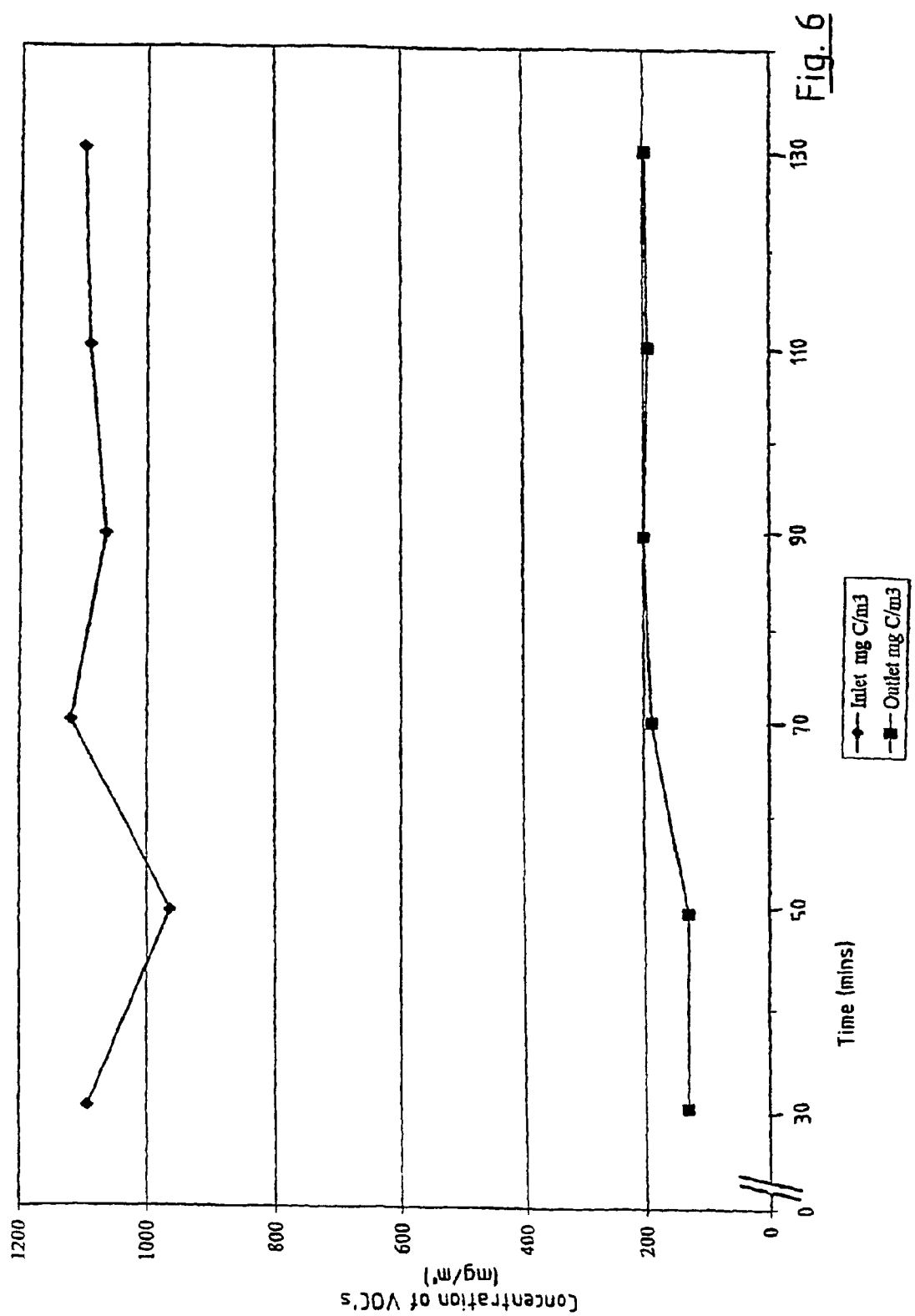

Test No. 2
- A recirculation line was fitted.
- The inlet air was set at 100-125 $m^{31}$ hr/$m^3$ media with an outlet flow of the same volume.
- The recirculation airline was controlled by a needle valve. The maximum recirculation possible through the system was found to be a 1:3 ratio 300-400 $m^3$/hr/$m^3$.
- Thus the inlet air was spinning around through the system 3 times with a nominal retention time of 36-28 seconds and an effective retention time of 108-85 seconds.
- Average removal was between 83-91% of total inlet solvent concentrations.
- Mass balance calculations of solvent usage versus inlet and outlet concentrations were within experimental error of <10%.
- The pressure difference across the shells remained under 500 Pascals showing no excessive build up of biomass.
- The recirculation water showed only trace organic species when scanned by GC-MS (Gas chromatography—mass spectrophotometry).
- Bacterial activity on the shell media remained high at $10^7$ colony forming units per gramme media material.
- The results of this test are shown in FIG. 6.

Conclusion

With a through-put the equivalent of the optimum loading for maximum extraction when feeding highly contaminated air through the biofilter recirculation dramatically increased the extraction.

Test No. 3

Figure 7:
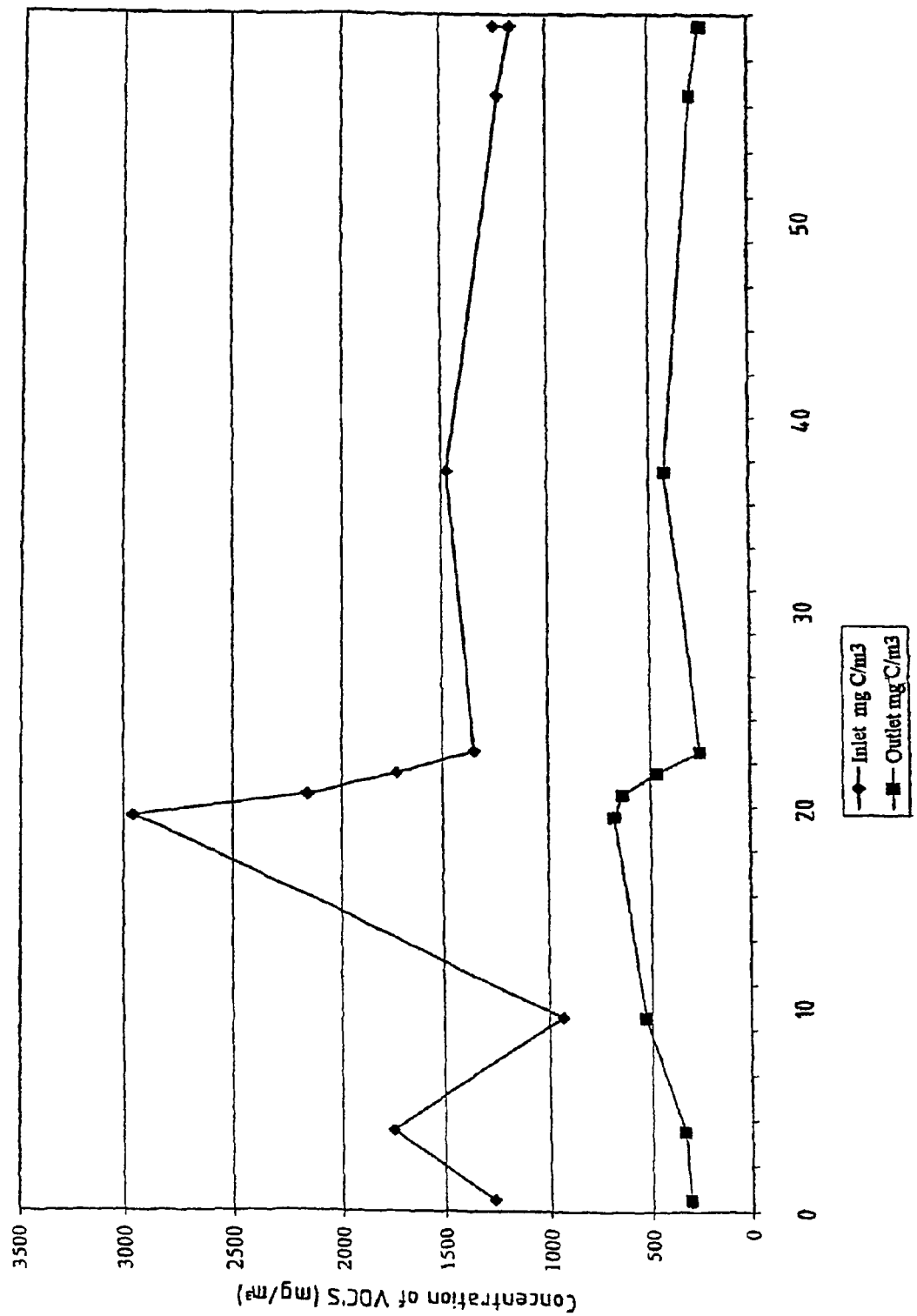

In Test 3, (the graphical results of which are shown in FIG. 7), an 8 Colour Heated Printer, running 16 hours a day, 5 days a week, the air was recirculated three times and the removal rates as given on the Table below were achieved.

| Date | Inlet mg C/$m^3$ | Outlet mg C/$m^3$ | % Removal | Elimination g/hr |
|---|---|---|---|---|
| 2/07 | 1259 | 309 | 75% | 114 |
| 5/07 | 1752 | 336 | 81% | 170 |
| 10/07 | 935 | 531 | 45% | 48.5 |
| 19/07 | 2955 | 682 | 77% | 272 5:1 |
| 20/07 | 2157 | 643 | 70% | 182 |
| 21/07 | 1729 | 468 | 73% | 151 |
| 22/07 | 1343 | 251 | 81% | 131 |
| 04/08 | 1470 | 424 | 73% | 105 |
| 21/08 | 1215 | 292 | 76% | 111 |
| 24/08 | 1154 | 243 | 79% | 109 |
| 24/08 | 1232 | 231 | 81% | 120 |

Apparently, there is a 20-30% removal of high concentration VOCs of the order of 1,000 to 5,000 mg/$m^3$ on a single pass at high loading of up to 200-250 mg/$m^3$ media/hr. This appears to be the maximum VOC removal that can be achieved. However, by recirculating, effectively the removal is greatly increased. It appears that there must be some different kinetic removal involved such as first order kinetics in the sense that 20-30% removal is achieved at each cycle of air through the filter.

Figure 8:
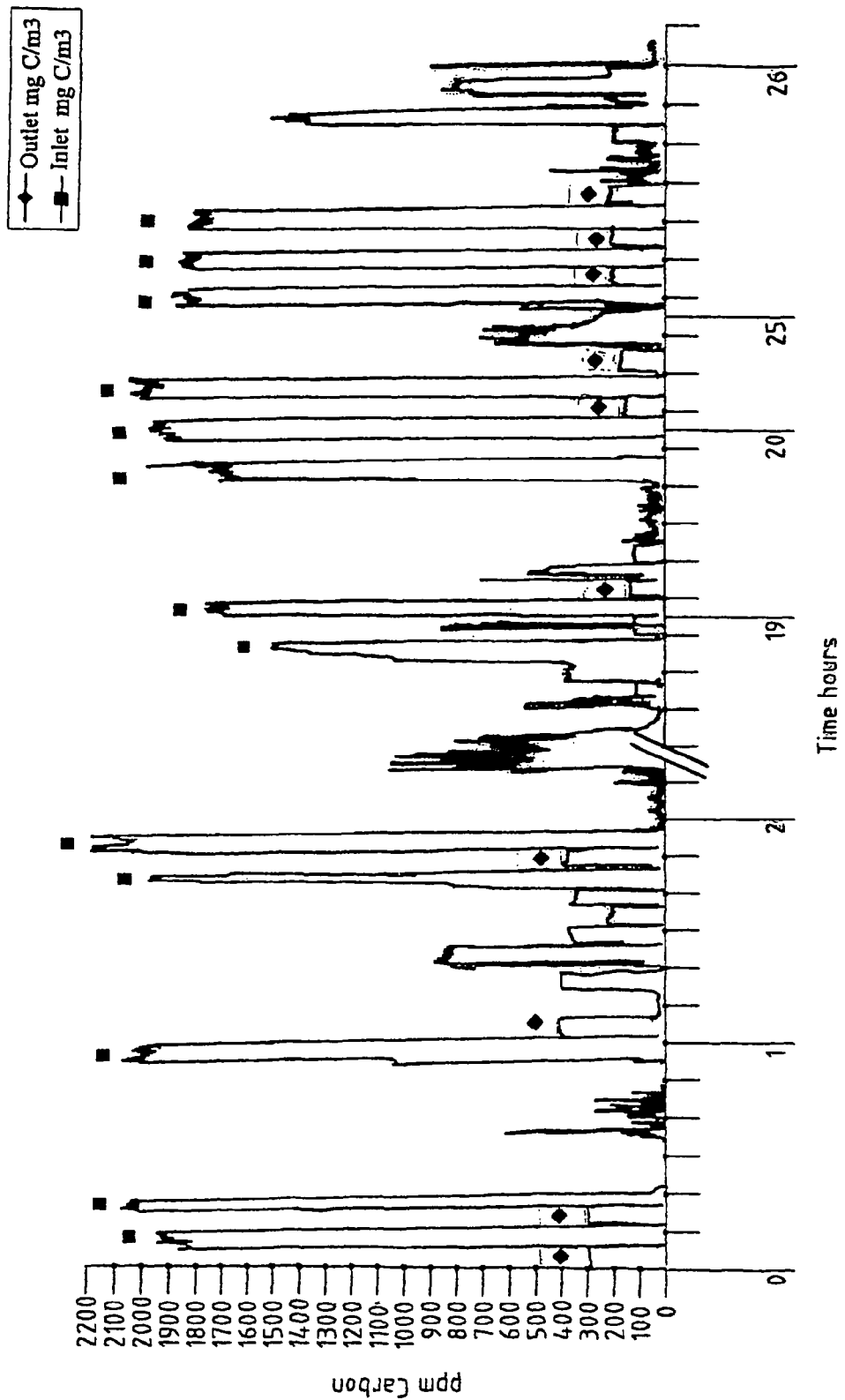

Referring now to FIG. 8, the chromatogram once again shows a significant VOC removal efficiency of a biofilter according to this invention.

Test No 4

Lab scale pilot plants according to the invention were installed incorporating two columns treating up to 2,500 mg/$m^3$ VOC. One column incorporated a device for emitting electromagnetic radiation the other was a control. Such a device is described in PCT Patent Specification No. WO 96/22831 and the disclosure is incorporated herein by reference. Comparisons demonstrated some notable effects the systems were reconfigured so that the inlet air was recirculated, air was recirculated at a ratio of 1:4 with a total retention time of approx. 25 seconds, xylene, benzene and toulene are introduced to the air stream at average total concentrations of 5000 mg/$m^3$ air, the removal efficiencies of the columns at a recirculation ratio of 1:4 are:

| Control: | 80% |
|---|---|
| Electromagnetic Stimulation: | 87-91% | on microbial analysis of both the recirculation water and the shell media it is apparent that there are differing populations of bacteria present in the two biofilters, the electromagnetic (EM) radiation device reduced sludging effects in the sump of the stimulated water, after 3 months operation the air flow through the control biofilter reduced considerably whereas in the biofilter using the EM radiation it remained constant, there were differing microbial populations present in the biofilters, this was evidenced by microbiological analysis of the water.

In the specification the terms "comprise, comprises, comprised and comprising" or any variation thereof and the terms "include, includes, included and including" or any variation thereof are considered to be totally interchangeable and they should all be afforded the widest possible interpretation.

The invention is not limited to the embodiments hereinbefore described but may be varied within the scope of the appended claims.

The invention claimed is:

1. A process for the biofiltration of volatile organic compounds (VOCs) including delivering contaminated effluent gas through a biofilter, the biofilter having an inlet, outlet and a micro-organism laden filter media bed, the filter media bed having moisture retaining properties and the filter media bed being suitable for the absorption, microbial oxidation and degradation of the VOCs and the process also including delivering liquid across the filter media bed, the process comprising:— delivering contaminated effluent gas to the biofilter inlet at a biofilter throughput rate and removing the filtered air through the outlet at the same rate;

recirculating the effluent gas within the biofilter whereby the rate at which gas passes through the filter media exceeds the biofilter throughput rate at the inlet and outlet, and the inlet gas being effectively diluted within the biofilter; and stimulating the liquid delivered across the filter media bed by electromagnetic radiation to favor growth of certain bacterial species while inhibiting the growth of others, thereby preventing build-up of biomass in the biofilter and increasing the dissolution properties of the recirculating liquid.

2. The process as claimed in claim 1, wherein the VOC concentration at the outlet is monitored.

3. The process as claimed in claim 2, wherein the VOC concentration in the output air is monitored and when the VOC concentration exceeds a pre-set limit, recirculation is carried out.

4. The process as claimed in claim 1, wherein the VOC concentration at the inlet is monitored.

5. The process as claimed in claim 1, wherein the biofilter throughput rate is determined having regard to the volume of effluent gas to be processed.

6. The process as claimed in claim 1, wherein the number of times recirculation is carried out and hence the media throughput achieved, depends on the backpressure generated by the filter media.

7. The process as claimed in claim 1, wherein recirculation is carried out when the level of VOCs removed by the biofilter is not sufficient to maintain the micro-organisms within the filter media bed.

8. The process as claimed in claim 1, wherein the amount of filter media is chosen having regard to optimum operation below a chosen base inlet VOC concentration and in which the air is recirculated when the concentration exceeds the chosen base concentration.

9. The process as claimed in claim 1, wherein when the inlet concentration of VOC falls below a preset limit for a predetermined length of time VOCs are added to the filter media bed.

10. The process as claimed in claim 9, wherein VOCs are added to the filter media bed by delivering water with dissolved VOCs across the filter media bed.

11. The process as claimed in claim 1, wherein the liquid is delivered across the filter media bed at a rate of between 20 to 50 $l/m^3$ media/minute.

12. The process as claimed in claim 11, wherein the rate is 30 $l/m^3$ media/minute.

13. The process as claimed in claim 11, wherein the rate increases depending on the levels of VOC passing through the filter media bed.

14. The process as claimed in claim 1, wherein the wetting is achieved by recirculating the liquid over the filter media bed from a storage sump.

* * * * *